United States Patent [19]
Ortiz

[11] Patent Number: 5,926,437
[45] Date of Patent: Jul. 20, 1999

[54] METHOD AND APPARATUS FOR SEISMIC EXPLORATION

[75] Inventor: Edgar J Ortiz, Houston, Tex.

[73] Assignee: Halliburton Energy Services, Inc., Houston, Tex.

[21] Appl. No.: 08/826,834

[22] Filed: Apr. 8, 1997

[51] Int. Cl.[6] .................................. G01V 1/28; G01V 1/40
[52] U.S. Cl. .................................. 367/35; 367/25; 367/31; 367/911; 181/105; 175/40
[58] Field of Search .................................. 367/25, 30, 31, 367/35, 37, 911; 181/105, 111, 112; 175/40, 50

[56] References Cited

U.S. PATENT DOCUMENTS

| | | | |
|---|---|---|---|
| 4,775,009 | 10/1988 | Wittrisch et al. | 166/250 |
| 5,229,554 | 7/1993 | Cole | 181/121 |
| 5,243,562 | 9/1993 | Laurent et al. | 367/25 |
| 5,363,094 | 11/1994 | Staron et al. | 367/86 |
| 5,524,709 | 6/1996 | Withers | 166/250.1 |
| 5,537,364 | 7/1996 | Howlett | 367/25 |

FOREIGN PATENT DOCUMENTS 2276723   10/1994   United Kingdom .

*Primary Examiner*—Nelson Moskowitz

[57] ABSTRACT

A seismic source and seismic detector are placed within a wellbore, and are secured in generally fixed relation within the wellbore. Multiple sources can be utilized, or multiple detectors may be utilized, within a single wellbore. Also, additional sources or detectors may be placed in adjacent wells. The source may be periodically actuated to obtain seismic data, and subsequent actuation may be directly compared with prior actuations to evaluate reservoir characteristics.

15 Claims, 3 Drawing Sheets

METHOD AND APPARATUS FOR SEISMIC EXPLORATION

BACKGROUND OF THE INVENTION

The present invention relates generally to methods and apparatus for acquiring seismic data within reservoirs; and more specifically relates to methods and apparatus for improved evaluation of subsurface reservoirs, and which facilitate monitoring of formation conditions over extended time periods.

Many techniques have been proposed or utilized to evaluate subsurface formations through use of seismic data. One such technique is vertical seismic profiling (VSP), wherein one or more seismic detectors, such as geophones or hydrophones, are placed within a wellbore while a seismic source is actuated at the earth's surface. In some applications, a single seismic detector is located at different depths within the wellbore and measures energies of multiple "shots" of energy input into the earth; while in other applications multiple sensors are distributed within the well and each measures energies from a seismic shot. An analogous technique is that of reverse seismic profiling (RVSP), wherein a seismic energy source, such as for example an explosive source or airgun, is disposed within a wellbore while a plurality of seismic detectors are distributed, such as in a linear array, along the earth surface. In some cases, the energy generated by the bit has been used as the seismic source.

When VSP is utilized, the detectors respond to both upwardly propagating and downwardly propagating waves. This yields multiple arrivals and can lead to interpretational difficulties. The use of RVSP helps to minimize the presence of conflicting wave traces, in that the detectors are responsive only to upwardly propagating waves, and thus it is typically easier to define events resulting from the first arrival, and thereby to obtain improved interpretation and resolution. Both VSP and RVSP suffer from the drawback, however, that the propagating source energies must typically traverse a substantial volume of formation which is not relevant to evaluation of a region of interest. The traversing of this volume will often lead to substantial and undesirable attenuation of the source energies, thereby rendering the interpretation more difficult and adversely impacting the formation evaluation.

Another technique which has been utilized in the seismic industry is that of cross-well seismic profiling or cross-well tomography, (collectively, herein, "CSP). In cross-well analysis, a seismic source is placed in one wellbore, and one or more seismic detectors are placed in another, laterally offset, wellbore. Actuation of the seismic source generates an energy wave which propagates through a formation of interest, to yield seismic data. The generation and detecting of the seismic energies can typically be relatively localized relative to the formation of interest.

In both VSP and CSP, however, where multiple detectors are utilized, they are typically distributed generally linearly relative to the axis of the wellbore (i.e., they would be vertically arrayed in a vertical borehole). Thus, all energies are detected at the path of the borehole.

One other technique which has been utilized is "4D" seismic modeling. Such method includes the taking of three dimensional seismic data over an extended period of time; while leaving the detectors in place, either at the earth's surface or on the ocean floor. This system has limitations, however, in that it is often not practical to leave either geophones or a seismic source at a fixed location at the earth's surface (either on land or on the ocean floor), over an extended period of time. Further, when detectors are arranged in such a manner over an extended period, there is often a likelihood of movement of one or more of the detectors. Such movement may be highly detrimental to the seismic monitoring.

Prior to the present invention, available seismic surveying techniques have not provided a mechanism by which a formation could be monitored over an extended time period with detectors secured in a fixed position relative to one another. Further, it has not been possible to monitor a reservoir with downhole detectors permanently placed within the reservoir or in nearby formations. Prior art systems, therefore, have been limited in their usefulness to monitor parameters such as the condition and performance of a subsurface reservoir during the production life of that reservoir. Beyond the objective of monitoring fluid movement within the reservoir, the present system facilitates detailed stratigraphic mapping of the reservoir, and further facilitates utilizing such seismic data to provide enhanced correlation of seismic and logging data to yield more detailed definition of the reservoir.

Accordingly, the present invention provides such a new method and apparatus for acquiring seismic data subsurface formations; and further provides a system which is particularly adapted to evaluation of a reservoir over an extended time period.

SUMMARY OF THE INVENTION

Methods and apparatus in accordance with the present invention facilitate the placing of a seismic source and a seismic detector within a wellbore; and the securing of the source and the detector in generally fixed relation relative to the wellbore. The detectors may be permanently placed within or near the reservoir. In selected implementations, the seismic sources may be utilized at the earth's surface. However, in a preferred implementation of the invention, a seismic source will be placed within the formations within or near the wellbore. This subsurface seismic source may be utilized alone, or in combination with other sources, either at a subterranean location or at the land surface. Where desired, multiple sources may be utilized within a wellbore, or multiple detectors may be utilized within a wellbore. Additionally, where the formation to be evaluated has a region of interest with multiple wells extending proximate thereto, additional seismic sources and/or detectors may be located in one or more of the additional wells.

The securing of the source and detector within the well facilitates establishing a fixed placement for multiple seismic surveys of the formations surrounding the wellbore, or wellbores. These multiple evaluations may be conducted over an extended period of time, and thus may be used to track production and/or reservoir conditions. In one particularly preferred implementation, the seismic data will be compared to logging data relative to the formation so as to optimally correlate with the seismic data for reservoir definition.

DETAILED DESCRIPTION OF PREFERRED EMBODIMENTS

Figure 1:
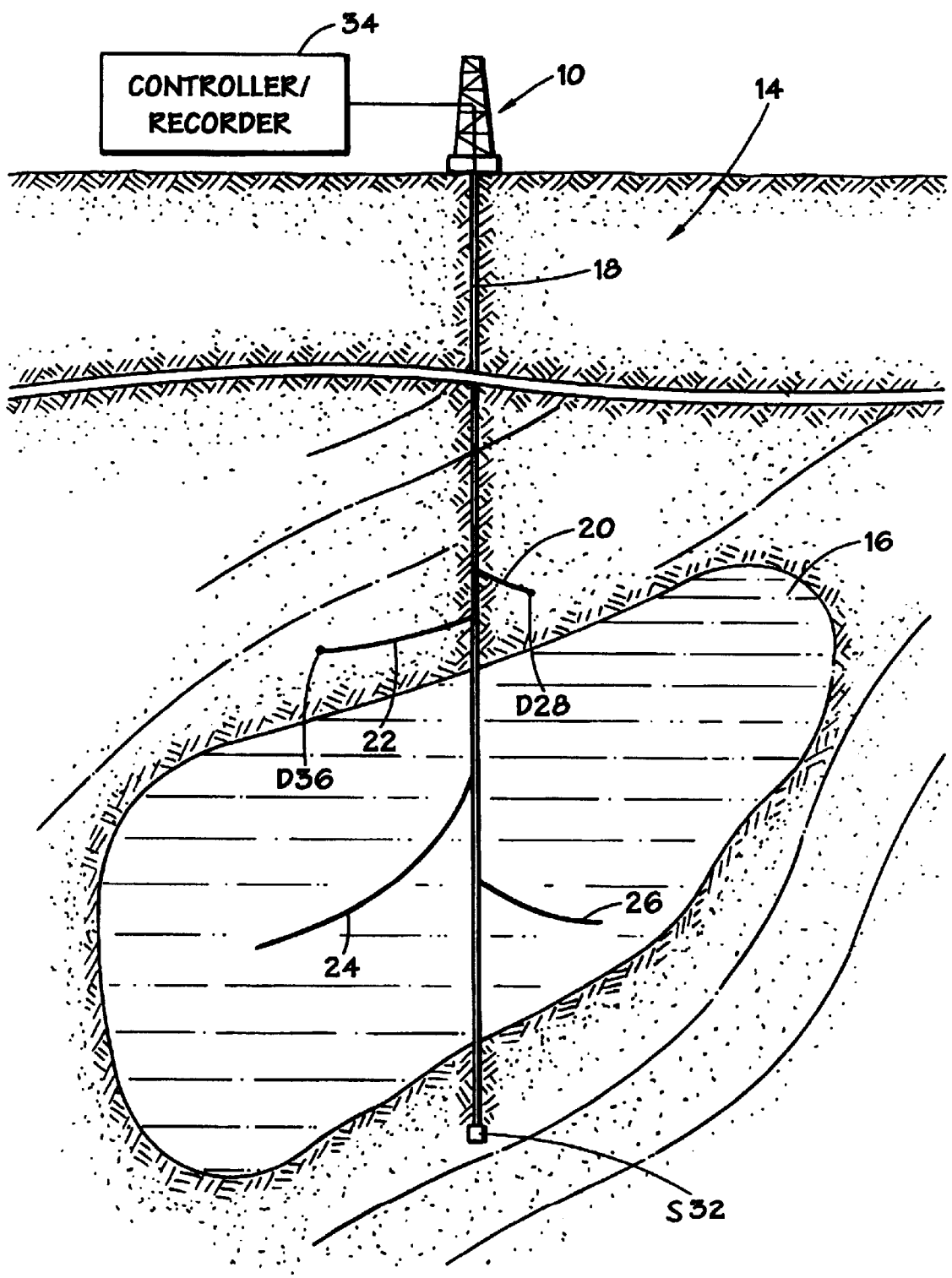
FIG. 1 schematically depicts an exemplary embodiment of a seismic exploration system in accordance with the present invention, depicted in an operative installation within a wellbore.
Figure 2:
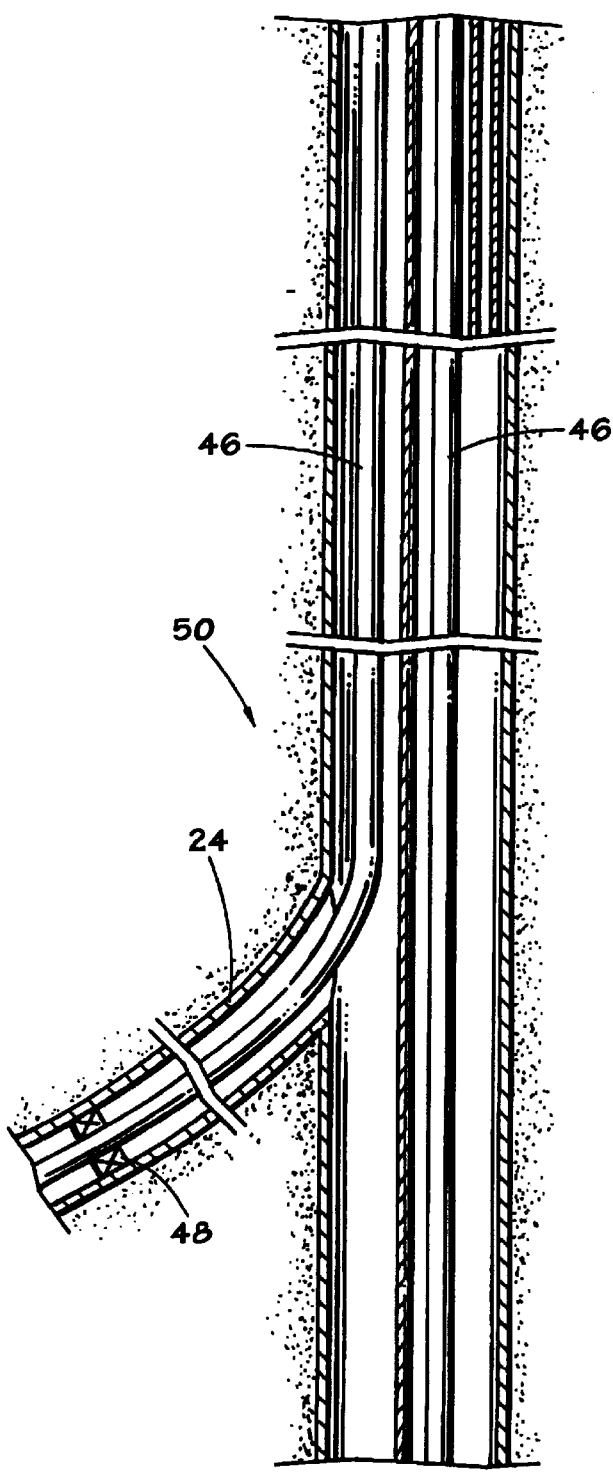
FIG. 2 schematically depicts portions of the seismic exploration system of FIG. 1, in greater detail.

Referring now to the drawings in more detail, and particularly to FIGS. 1 and 2, therein is depicted in FIG. 1 an exemplary seismic exploration system in accordance with the present invention, indicated generally at 10. Seismic exploration system 10 is disposed in an exemplary operative configuration, with components located within a wellbore 12 penetrating earth formations, indicated generally at 14. FIG. 2 depicts portions of wellbore 12 in greater detail.

For purposes of the following explanation, wellbore 12 is depicted as penetrating a reservoir 16 within earth formations 14. The formations forming reservoir 16 may contain fluids to be produced, including oil, gas or water. In the depicted embodiment, wellbore 12 is a multi-lateral well, having not only a generally vertically extending portion 18, but also multiple bores extending generally laterally therefrom, indicated generally at 20, 22, 24 and 26. As used herein, the term "multi-lateral" well includes a wellbore having a primary path, and multiple bores extending therefrom. These multiple bores may extend for thousands of feet or to as little as several inches or feet (also termed, herein, "sidetracks"). Expressly contemplated are the use of short or small diameter bores ("microbores"). For example, it is contemplated that detectors may be placed within cavities formed in the formation through sidewell coring. Lateral bores 24 and 26 extend within reservoir 16, and may be used to produce the formation. Lateral bores 20 and 22 extend above reservoir 16 and facilitate location of seismic detectors D28, D30. A repeatably actuable seismic source S32 is located proximate a lower portion of wellbore 12. In the depicted embodiment source S32 is located beneath reservoir 16. It should be clearly understood, however, that this placement is illustrative only, and source32 or another source may be located above a reservoir or zone of interest.

In seismic exploration system 10, each seismic detector D28, D30 and seismic source S32 are retained in essentially fixed location relative to their respective portions of wellbore 12. Additionally, each is electrically coupled, such as through a wireline, to a controller assembly 34 located at the earth's surface. Controller assembly 34 will preferably facilitate the selective actuation of source S32 and the recording of received signals from each detector D28, D30. Controller assembly 34 will also preferably include a recorder or other mechanism for acquiring and archiving the acquired seismic data.

As indicated above, source S32 will preferably be a selectively actuable source which may be selectively and periodically actuated through the described wireline to impart energies into formation 14. Various types of seismic sources which could be utilized are known, including explosive sources and airguns. If an explosive source were to be utilized, the source would require the capability of multiple firings. Similarly, if an airgun were to be utilized, it would typically not be in communication with the surface through a wireline, but instead would communicate through a length of tubing. It is most preferred that seismic source S32 be an electrically actuable source capable of imparting energies within the range of approximately 500 Hz to 2,000 Hz. Sources having this capability are known in the industry, such as the Resonate Cavity Piezoceramic source offered by TomoSeis of Houston, Tex.

As noted above, source S32 will preferably be retained in generally fixed relation to wellbore 12 and the surrounding formation. This retention of position may be accomplished through various means known in the industry, including electro-hydraulically-actuable clamping mechanisms. However, a presently preferred method of securing seismic source S32 in position is to cement the source in place within wellbore 12. Cementing source 32 in place serves not only to facilitate identical shot placement for multiple actuations, but also optimizes coupling between the source and the surrounding formations.

Similarly, each seismic detector D28, D30 is preferably secured in essentially fixed relation to wellbore 12 and the surrounding formations. Each seismic detector D28, D30 is preferably in electrical communication with controller assembly 34 through a respective wireline. Each seismic detector D28, D30 may be of a selected type, such as a geophone, hydrophone or accelerometer, as desired. In many applications, such as the one described herein, it will be preferable that each seismic detector D28, D30 be a geophone. In many cases, it is most preferred that each seismic detector be a 3-component-geophone (or xyz-geophone).

Figure 3:
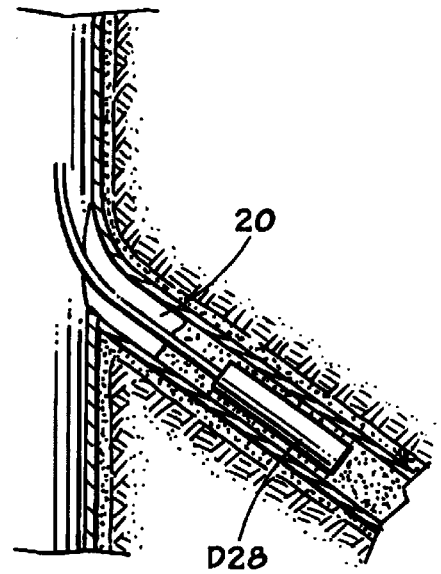
FIG. 3 depicts an exemplary installation of a geophone in the seismic exploration system of FIG. 1.
Figure 4:
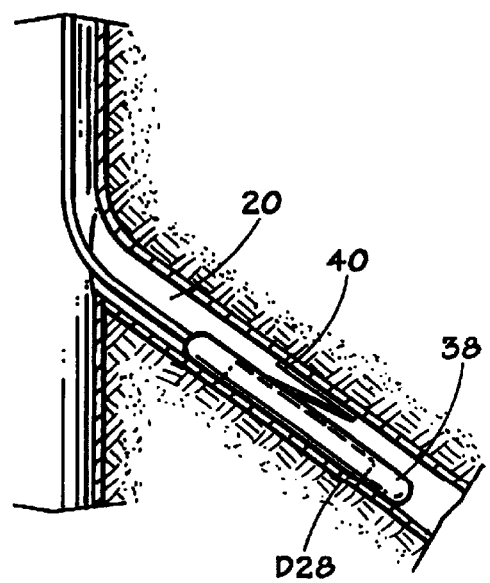
FIG. 4 depicts an exemplary alternative installation of a geophone in the seismic exploration system of FIG. 1.

Referring now also to FIGS. 3 and 4, therein are depicted alternative installation configurative for each geophone. In FIG. 3, seismic detector D28 is secured in position within lateral bore 20 by being cemented in place. Alternatively, as depicted in FIG. 4, seismic detector D28 may be housed within a protective housing 38 which includes an electrically-hydraulically extendible arm 40 which will secure housing 38, and thereby the seismic detector against a surface of lateral bore 20. Such housings and anchoring mechanisms are known in the industry.

Referring primarily to FIGS. 1 and 2, placement of the described seismic source S32 and seismic detectors D28, D30 can be accomplished in a relatively straight-forward manner, along with the placement of other equipment within wellbore 12. In one exemplary methodology, wellbore 12, including each multi-lateral bore 20, 22, 24 and 26 will be drilled in a conventional manner. As is familiar to those skilled in the art, a series of open hole logs, including an acoustic log, will typically be run within the open bore hole. Such logs may or may not be run within the lateral bores 20, 22, 24 and 26. These open hole logs, and particularly the acoustic log may be correlated with seismic data to be obtained at a later point in time, through use of the present invention, to facilitate optimal analysis of the reservoir dimension, condition and performance.

Once the open hole logs are run, casing will be placed within wellbore 12, including lateral bores 20, 22, 24, 26, and will be cemented in place through conventional techniques. It may then be preferable to place seismic source S32 within wellbore 12. As noted previously, in this illustrative embodiment, source S32 will be cemented in place. Spot placement of this cement may be accomplished through use of coiled tubing within wellbore 12, placed to an appropriate depth to facilitate spotting of the cement proximate source S32. It is preferred at this point in time to test source S32 to ensure that it is functioning as desired. Source S32 may be actuated, and confirmation of the energy output may be achieved through placement of either a geophone at the earth's surface or of a hydrophone within wellbore 12. Placement of the detector is not critical since the objective is merely to assure proper operation of source S32 prior to anchoring it within wellbore 12.

Next, lateral bores 24 and 26 may be at least partially prepared for production. This includes, for example, placement of tubing 46 having a packer 48 coupled thereto into each lateral bore 24, 26 from which production will be obtained (tubing 46 with packer 48 extending into lateral bore 24 is depicted in segment 50 of FIG. 2). Once tubing 46 and packer 48 are in place, each lateral bore 24 and 26 may be perforated. Alternatively, perforation may be postponed until a later time, and lateral bores 24 and 26 may each be perforated with a through tubing perforating gun.

Subsequently, seismic detectors D28, D30 may be placed within lateral bores 20 and 22, respectively. Once again, where seismic detectors D28, D30 are to be cemented into position, it may be advantageous to spot the cement through the use of coiled tubing.

It should be understood by those skilled in the art that if the dimensions of wellbore 12 are such that placement of seismic detectors D28, D30 is not convenient while tubing 46 is within wellbore 12, then such placement can be performed without tubing 46 within the wellbore. This may either be performed by disconnecting tubing 46 from a self-closing production packer after completion of each production lateral bore 24, 26; or may be accomplished by completing each production lateral bore 24, 26 after placement of the seismic detectors, when the wirelines are occupying minimal area within wellbore 12. Alternatively, if the dimension of the wellbore permits, it may be desirable to place seismic source S32 bore and seismic detectors D28 and D30, after completion of each production lateral bore 24, 26.

In operation of seismic evaluation system 10, the ability to place a detector, such as D30, at a laterally remote placement relative to the generally vertical path between seismic source S32 and a wellhead at the earth's surface, facilitates obtaining the benefits of cross-well seismic profiling, while also facilitating data acquisition in a manner similar to that obtainable with reverse vertical seismic profiling. However, because the source and detector are located proximate the region of maximum interest, the resolution which is obtainable is dramatically improved. As noted previously, this is due in substantial part to the fact that energies are transmitted and received proximate the region of interest, and do not have to travel between the earth's surface and the region of interest. This maximizes the strength of the first arrival, thereby facilitating improved interpretation. In fact, the greater the distance between the region of interest and the earth's surface, the greater the improvement which is realized through the use of the present invention. This is because energies which do travel to the earth's surface to be reflected back are more greatly attenuated as they pass through a greater distance, thereby yielding a maximized differential between the amplitude of the first arrival and the amplitude of the reflected later arrivals.

Additionally, because the present invention facilitates placing components such that the energies do not have to traverse as great a distance, it is possible to use energies at frequencies higher than that which would otherwise be practical. These higher frequency energies will then typically yield improved resolution, such as in thin-bed formations. For example, in conventional VSP or RVSP exploration it may be required to use energies in the range of 50–400 Hz. In contrast, frequencies within a range of 500 Hz to 2 kHz, and higher, are currently contemplated as useful with the present invention.

As noted previously, a particular advantage obtainable with the present invention relative to the prior art is the capability of monitoring the reservoir over an extended period of time. As noted previously, when wellbore 12 is drilled, open hole logs will typically be run. These logs are typically utilized to determine the density and porosity of the formations proximate wellbore 12. However, as is well known, the depth of investigation of such open hole logs is relatively limited, in most cases less than 4 feet into the formations surrounding the wellbore. However, these open hole logs provide a mechanism for calibrating the seismic data to facilitate optimized monitoring of changes in density and/or porosity within the reservoir. This can be useful, for example, in monitoring the reservoir performance over an extended period of time. For example, seismic data may be taken over a period of time extending 2–3 months, or even over 1 year or a period of years. By modeling such seismic data in accordance with established 3-D seismic modeling techniques, and by calibration of such data with the open hole acoustic (or other) logs, movement of fluids within the reservoir over time may be monitored. Further, such evaluation may facilitate the merits of production enhancement techniques such as water flood recovery for example, to maximize production from the reservoir. This capability is achievable only because the seismic detectors can remain in a fixed position and orientation relative to one another whereby successive measurements can be precisely correlated with prior measurements.

Figure 5:
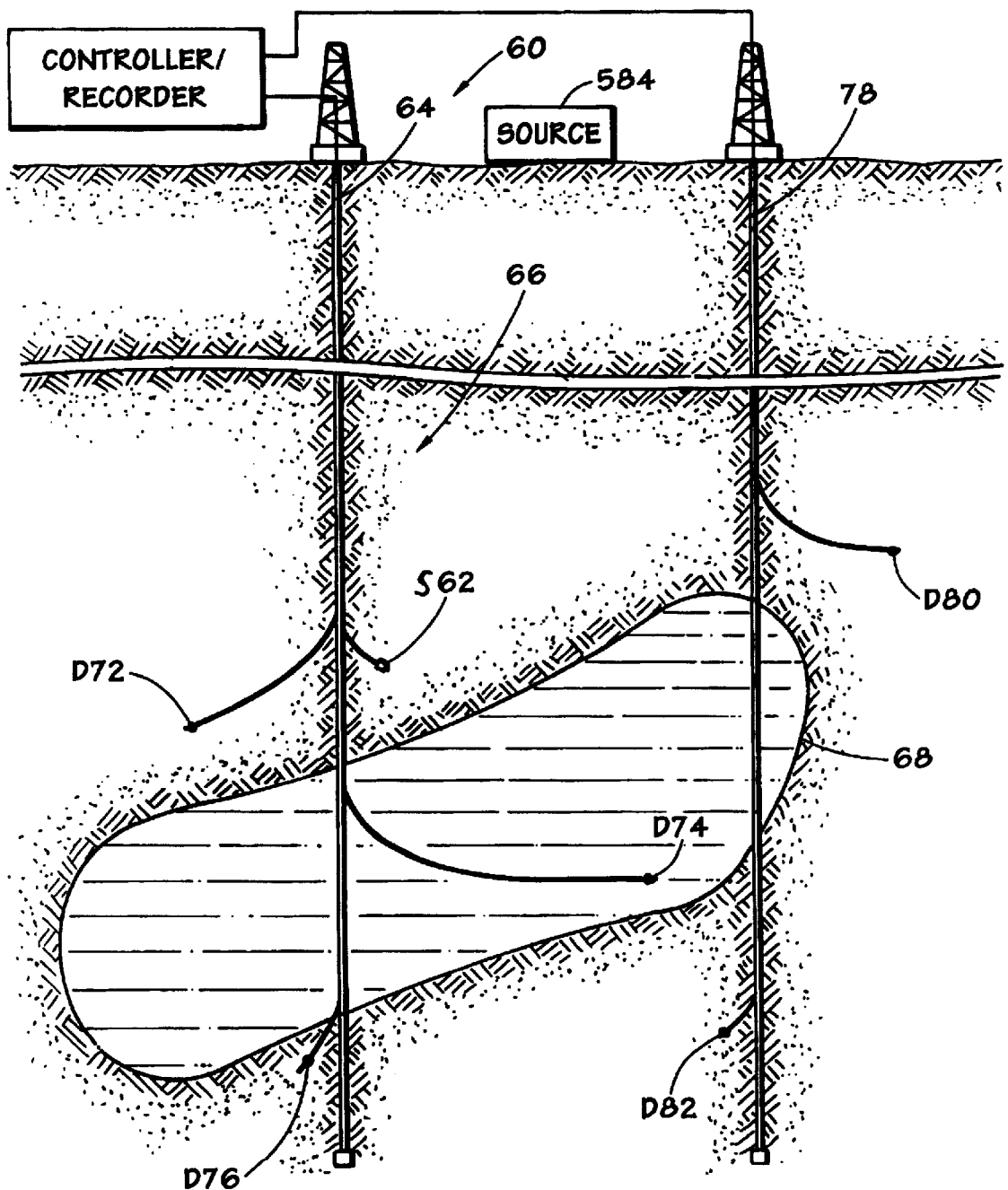
FIG. 5 depicts another exemplary embodiment of a seismic exploration system in accordance with the present invention.

Referring now to FIG. 5, therein is depicted another exemplary embodiment of a seismic exploration system 60 in accordance with the present invention. Seismic exploration system again includes a seismic source S62 placed with a wellbore 64 extending through earth formations, indicated generally at 66, including a reservoir 68. Wellbore 64 is again a multi-lateral well. However, in evaluation system 60, source S62 is located in a short "sidetrack" 70 to wellbore 64, and is situated above the formations of interest defining reservoir 68, rather than below the reservoir as in seismic evaluation system 10. Seismic exploration system 60 also includes a second source S84 located at the land surface. Also, unlike seismic exploration system 10, seismic exploration system 60 includes seismic detectors D72, D74 and D76 which are located at several locations relative to reservoir 68, including above reservoir 68 (detector D72), within reservoir 68 (detector D74), and below reservoir 68 (detector D76). Additionally, a second wellbore 78 penetrates both formations 66 and reservoir 68. Wellbore 78 has two seismic detectors D80, D82 located therein. Although not expressly depicted in FIG. 5, either wellbore 64, 78 might include one or more lateral bores or other provisions for producing from reservoir 68. Additionally, although only two wellbores have been described herein, it will be appreciated by those skilled in the art that where other wellbores are appropriately placed, it will be a matter of professional judgment as to whether additional seismic sources or detectors might be placed within those other bores. Each source and detector will be fixed in position within each wellbore, as previously described relative to the embodiment of FIGS. 1–4.

Operation of seismic evaluation system 60 is analogous to that described relative to system 10 of FIGS. 1–4. As previously discussed, the ability of placing seismic detectors in non-vertically aligned positions within a wellbore facilitates obtaining analysis analogous to that obtainable with true cross-well seismic profiling. Those same capabilities are presented in seismic exploration system 60, plus the correlation with detectors which are located in an additional laterally offset wellbore, thereby further facilitating true cross-well seismic profiling Many modifications and variations may be made in the techniques and structures described and illustrated herein without departing from the spirit and scope of the present invention. For example, the seismic source and detectors have been described herein as communicating with the surface through means of wirelines. Alternatively, it may be possible to utilize a source and/or detectors which have a self-contained power supply, and which are selectively actuated through various mechanisms known in the industry, including fluid pulses, acoustic wave or electromagnetic wave wireless transmissions. Accordingly, it should be clearly understood that the techniques and structures described and illustrated herein are illustrative only, and are not to be considered as limitations upon the scope of the present invention.

What is claimed is:

1. A method of seismic surveying, comprising the steps of:

placing a seimic energy source in a wellbore having casing therein, and securing said seismic energy source in generally fixed position relative to said wellbore;

placing at least one seismic detector in a wellbore having casing therein, and permanently securing said detector within said casing and in generally fixed relation to said casing; and actuating said seismic energy source and detecting energies at said detector.

2. The method of claim 1, further comprising the step of subsequently reactuating said seismic source and detecting energies at said seismic detector.

3. The method of claim 1, wherein said at least one seismic detector comprises a plurality of seismic detectors placed within said wellbore, and wherein each said detector is permanently secured within said casing and in generally fixed relation to said casing.

4. The method of claim 1, wherein said wellbore in which said energy source is placed is the same wellbore in which said seismic detector is placed and secured.

5. A method of seismic evaluation of a region of interest in an earth formation having a wellbore extending therethrough, comprising the steps of:

placing a seismic source within said cased wellbore, said seismic source placed generally to one vertical extent of said region of interest;

securing at least one seismic detector at a second location within said wellbore and within said casing, said second detector placed at the opposite vertical extent of said region of interest, wherein said seismic source is placed generally below said region of interest, and wherein said seismic detector is placed generally above said region of interest;

securing said seismic detector in generally fixed relation to said wellbore;

providing a controller assembly, and establishing communication between said controller assembly and said seismic source and said seismic detector; and utilizing said controller assembly to actuate said seismic source and to receive energies detected at said seismic detector.

6. The method of claim 5, wherein said seismic source is placed in a lateral bore.

7. The method of claim 5, further comprising the step of placing an additional seismic detector within said wellbore.

8. A method of seismic evaluation of a region of interest in an earth formation having a first wellbore extending therethrough and wherein a second wellbore extends proximate said region of interest, comprising the steps of:

placing a seismic source within said first cased wellbore, said seismic source placed generally to one vertical extent of said region of interest;

securing at least one seismic detector at a second location within said first wellbore and within said casing, said second detector placed at the opposite vertical extent of said region of interest;

securing said seismic detector in generally fixed relation to said first wellbore;

placing at least one of a seismic detector and a seismic source in said second wellbore;

providing a controller assembly, and establishing communication between said controller assembly and each said seismic source and seismic detector; and utilizing said controller assembly to actuate said seismic source and to receive energies detected at said seismic detector.

9. The method of claim 5, further comprising the steps of:

periodically reactuating said seismic source and receiving energies at said seismic detector; and producing a fluid from said region of interest in said formations between selected actuations of said seismic source.

10. A method of seismic evaluation of a region of interest in an earth formation having a cased wellbore extending therethrough, wherein said cased wellbore comprises a primary wellbore and further comprises at least one lateral bore extending from said primary wellbore, comprising the steps of:

placing a seismic source within said cased wellbore, said seismic source placed generally to one vertical extent of said region of interest;

securing at least one seismic detector at a second location within said wellbore and within said casing, said second detector placed at the opposite vertical extent of said region of interest, wherein at least one of said source and said detector is placed within said lateral bore in said cased wellbore;

securing said seismic detector in generally fixed relation to said wellbore;

providing a controller assembly, and establishing communication between said controller assembly and said seismic source and said seismic detector; and utilizing said controller assembly to actuate said seismic source and to receive energies detected at said seismic detector.

11. A method of evaluating an earth formation having a wellbore extending therein, said wellbore having casing therein, comprising the steps of:

placing a seismic source at a first location within said wellbore and anchoring said seismic source within said casing in generally fixed relation to said casing and the formations surrounding said wellbore;

placing a seismic detector at a second location within said wellbore casing and securing said seismic detector to said casing in generally fixed relation to said wellbore and the formations surrounding said wellbore;

placing a controller assembly at a surface location;

establishing communication between said detector and said controller assembly; and actuating said seismic source and detecting energies at said seismic detector.

12. The method of claim 11, further comprising the step of placing a second seismic detector at a third location within said wellbore, and securing said second detector in generally fixed relation relative to said wellbore and the formations surrounding said wellbore.

13. The method of claim 11, wherein said step of establishing communication between said detector and said controller assembly is performed by establishing an electrical conductor extending between said detector and said controller assembly.

14. The method of claim 11, further comprising the step of establishing communication between said seismic source and said controller assembly.

15. The method of claim 14, wherein said communication between said detector and said controller assembly is established through use of an electrical conductor.

* * * * *